United States Patent
Cota-Robles et al.

(10) Patent No.: US 8,914,684 B2
(45) Date of Patent: Dec. 16, 2014

(54) METHOD AND SYSTEM FOR THROTTLING LOG MESSAGES FOR MULTIPLE ENTITIES

(75) Inventors: Erik Cota-Robles, Mountain View, CA (US); Igor Korsunsky, Los Altos, CA (US)

(73) Assignee: VMware, Inc., Palo Alto, CA (US)

(*) Notice: Subject to any disclaimer, the term of this patent is extended or adjusted under 35 U.S.C. 154(b) by 1209 days.

(21) Appl. No.: 12/472,180

(22) Filed: May 26, 2009

(65) Prior Publication Data

US 2010/0306599 A1   Dec. 2, 2010

(51) Int. Cl.
G06F 11/00  (2006.01)
G06F 11/34  (2006.01)
G06F 11/07  (2006.01)
G06F 13/10  (2006.01)

(52) U.S. Cl.
CPC .......... *G06F 13/102* (2013.01); *G06F 11/0784* (2013.01); *G06F 11/0706* (2013.01)
USPC .................. 714/44; 714/20; 714/57; 719/321

(58) Field of Classification Search
USPC .................. 714/20, 45, 44, 57; 719/318, 321
See application file for complete search history.

(56) References Cited

U.S. PATENT DOCUMENTS

| | | | | |
|---|---|---|---|---|
| 5,740,355 | A * | 4/1998 | Watanabe et al. | 714/45 |
| 6,735,756 | B1 * | 5/2004 | Linn et al. | 716/116 |
| 7,039,836 | B2 * | 5/2006 | Powers et al. | 714/48 |
| 7,213,176 | B2 * | 5/2007 | Banko | 714/38.12 |
| 7,917,811 | B2 * | 3/2011 | Yamamoto | 714/44 |
| 2002/0124201 | A1 * | 9/2002 | Edwards et al. | 714/5 |
| 2002/0152335 | A1 * | 10/2002 | Holm et al. | 710/8 |
| 2004/0003327 | A1 * | 1/2004 | Joshi et al. | 714/47 |
| 2004/0260804 | A1 * | 12/2004 | Grabarnik et al. | 709/224 |
| 2005/0278706 | A1 * | 12/2005 | Garza et al. | 717/128 |
| 2006/0130071 | A1 * | 6/2006 | Martin et al. | 719/319 |
| 2006/0200701 | A1 * | 9/2006 | Callender | 714/38 |
| 2008/0005620 | A1 * | 1/2008 | Walker | 714/43 |
| 2008/0301496 | A1 * | 12/2008 | Fujishita | 714/20 |
| 2009/0144731 | A1 * | 6/2009 | Brown et al. | 718/1 |

* cited by examiner

*Primary Examiner* — Joseph Schell

(57) ABSTRACT

A software module capable of simultaneously supporting multiple services provides log message throttling for each service with a separate "per service" log message buffer. When the software module is a device driver, for example, each device controlled by the device driver is allocated a message buffer to store descriptive log messages. Upon generation of a warning log message, descriptive log messages in the message buffer are flushed to a log file for review by an administrator. Furthermore, log message throttling may be implemented by only flushing the message buffer upon certain occurrences of warning log messages, such as in accordance with an exponential back-off algorithm.

20 Claims, 5 Drawing Sheets

METHOD AND SYSTEM FOR THROTTLING LOG MESSAGES FOR MULTIPLE ENTITIES

BACKGROUND OF THE INVENTION

Computer administrators typically review error log files stored on a disk drive or other permanent storage media (e.g., flash drive) to investigate problems relating to the configuration and operation of devices in a computer system. These error log files contain text messages (or "log messages") that provide warnings and/or errors (referred to herein as "warning log messages") and descriptions and/or other information (referred to herein as "descriptive log messages") that enable the computer administrator to better understand why a warning log message may have occurred. Log messages in an error log file pertaining to a particular device are added to the log file as a result of log requests made by a device driver communicating with the device. A device driver, as part of its typical operation, will continually request descriptive log messages to be written to the error log file. Such descriptive log messages relate to a state of the device at the time the request was made. Additionally, to the extent that an error occurs during the device driver's communication with the device, the device driver will also request that a warning log message be written to the error log file.

Continual writing of log messages to an error log file requires continual access to the disk drive through repeated disk I/O (Input/Output) operations. To reduce such repeated disk I/O operations, a device driver can allocate a message buffer (typically, as a circular buffer) in RAM (Random Access Memory) of the computer system to preliminarily store descriptive log messages. When the device driver generates a warning log message, the device driver then flushes the descriptive log messages stored in the message buffer to the error log file. In this manner, descriptive log messages that arise during a time distant from the occurrence of a warning log message are simply overwritten in the circular buffer by other descriptive log messages and are therefore never written to the error log file. This result is desirable because such overwritten descriptive log messages are not relevant to resolving a warning log message since they relate to states of the computer system during times that are distant from the occurrence of the warning log message.

Another technique to minimize disk I/O operations is to "throttle" warning log messages. In many instances a device driver repetitively generates a great many warning log messages relating to the same error or device driver state because, for example, the device driver continually tries to unsuccessfully recover from the error or because the device driver repetitively encounters the same issue generating the warning (e.g., the device has become non-responsive or is otherwise not performing as expected). Because the same issue is repeatedly encountered, the same descriptive log messages that are relevant to the issue are continually generated and inserted into the circular buffer. During a first occurrence of the warning log message, these relevant descriptive log messages are flushed from the circular buffer into the error log file. As such, the occurrence of the repeated warning log messages causes the device driver to repeatedly flush the same relevant descriptive log messages from the message buffer to the error log file, thereby unnecessarily consuming disk I/O resources.

A device driver can "throttle" back warning log messages (i.e., flush the circular buffer only on certain occurrences of the repeated warning log message) utilizing a heuristic, such as an exponential back-off algorithm, to reduce its consumption of disk I/O resources. In one example of log throttling using exponential back-off, a device driver maintains a count, referred to herein as a "throttle count," and flushes the circular buffer each time a particular warning log message occurs until the throttle count is reached. Subsequent occurrences of the warning log message are exponentially ignored such that only the subsequent $2^N$ occurrences (i.e., $2^{nd}$, $4^{th}$, $8^{th}$, $16^{th}$, etc.) of the warning log message cause a flush of the message buffer. To properly keep track of different warning log messages that may be simultaneously occurring, the device driver needs to maintain a count for each particular warning log message instance. The device driver therefore needs to allocate a static local variable for each particular warning log message which can significantly increase the memory requirements of the device driver.

With the prevalence of standardized physical interfaces, such as USB (Universal Serial Bus), that support multiple types of devices, current device drivers have a corresponding capability to simultaneously support multiple devices that utilize such standardized physical interfaces. For example, a particular USB device driver may support multiple device types within a particular USB "class," such as a mass storage device class or an HID (human interface device) class. A mass storage USB device driver may support a computer system's communication with external hard drives, portable flash drives, digital cameras, portable media players and mobile phones. Similarly, an HID USB device driver may support the computer system's communication with a keyboard and a mouse, as well as joysticks, trackballs and other input devices. When such a "device class" driver simultaneously supports different connected devices, log messages are generated and stored in a circular buffer that is shared by all of the devices. As such, when the device driver generates a warning log message relating to one device, the log messages that are flushed from the message buffer to the error log file may relate to multiple devices, thereby complicating the administrator's task of isolating log messages relating to the device causing the warning log message. Furthermore, because the circular buffer has a limited size, descriptive log messages that are relevant to debugging a warning log message for one device may be inadvertently overwritten by descriptive log messages of other devices prior to being flushed to the error log file. This is particularly likely to be the case if one device has malfunctioned before another, thereby filling up the circular buffer and the error log file with log messages that have no relevance to a second device's failure. Additionally, a device driver that supports multiple devices and implements the foregoing log message throttling techniques may discard all of the warning messages related to the failure of a second failing device because throttling has occurred in response to the failure of a first device.

SUMMARY OF THE INVENTION

One or more embodiments of the present invention provide methods and systems for logging messages generated by a device driver that simultaneously supports multiple devices. Each device supported by the device driver is allocated its own message buffer to store log messages relating to such devices operations. Such "per-device" message buffers eliminate the foregoing discussed issues relating to loss of relevant log messages, difficulty in analyzing the log file and maintenance of "per-warning log message" throttle counts for each device.

In one such method, a device driver allocates a plurality of message buffers equal to the plurality of devices that it is simultaneously supporting, wherein each message buffer in the plurality of message buffers corresponds to one of the devices in the plurality of devices and is allocated to store log messages for the corresponding device. When the device driver generates a warning log message in response to interacting with one of the devices, it flushes log messages in the corresponding message buffer of the device to a log file upon generating the warning log message in accordance with a log message throttling heuristic. In this manner, log messages stored in a message buffer for one device are not overwritten by log messages relating to other devices. The error log file is more easily reviewable because log messages relating to a device are clustered together.

Additionally, memory space utilized by the device driver to maintain throttle counts can be reduced by allocating a throttle count for each device rather than allocating a throttle count for each warning log message of each device. A device driver's use of memory space is reduced and exponential back-off throttling of log messages due to a first failing device does not affect a second failing device.

DETAILED DESCRIPTION

Figure 1:
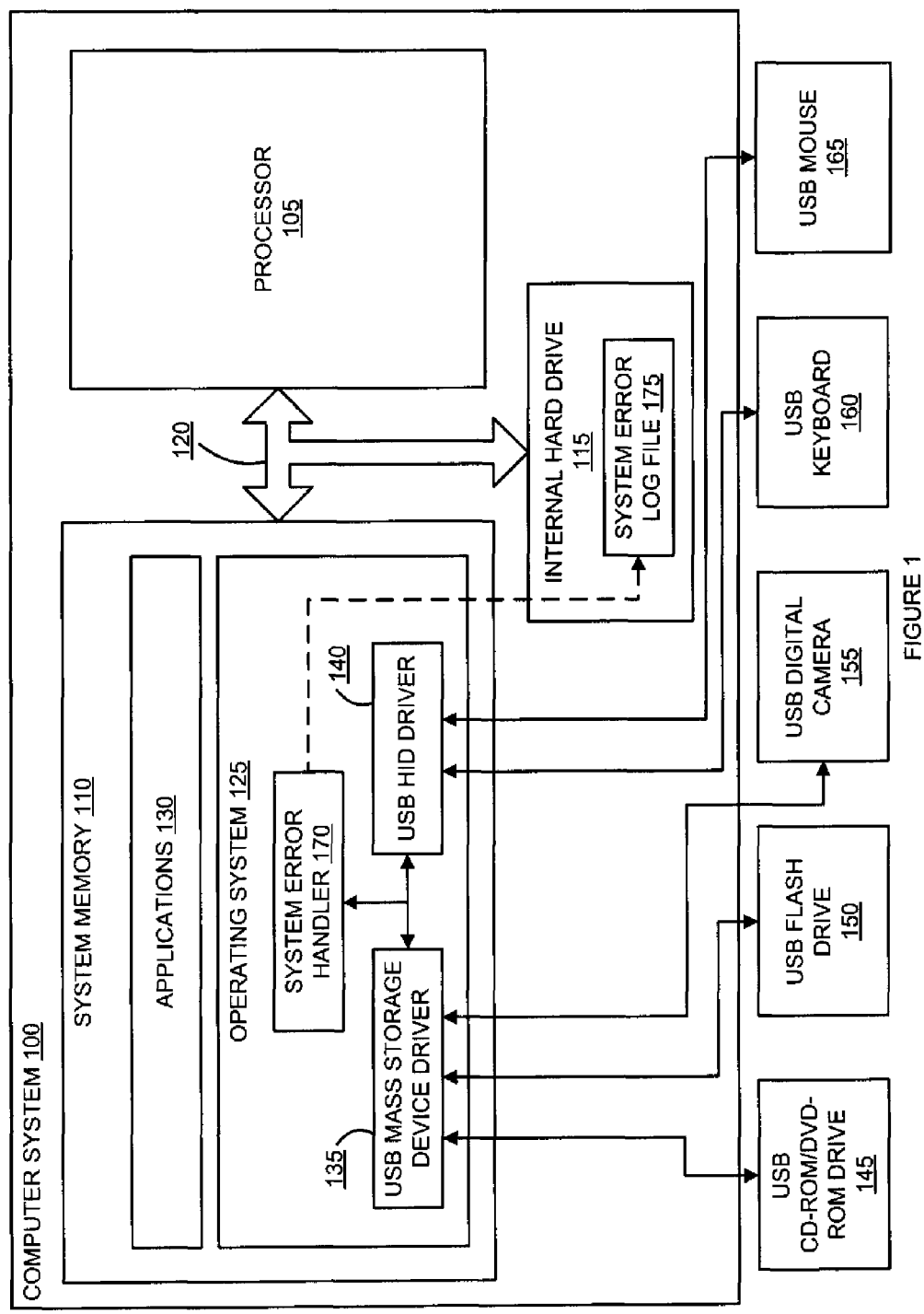
FIG. 1 depicts a block diagram of a computer system in which one or more embodiments of the invention may be utilized.

FIG. 1 depicts a block diagram of a computer system in which one or more embodiments of the invention may be utilized. Computer system 100 comprises a processor 105, a system memory (e.g., RAM) 110, and an internal hard drive 115. These components of computer system 100 communicate with each other through an internal bus system 120. System memory 110 supports the execution of an operating system 125 that enables a variety of applications 130 to run in computer system 100. In order to communicate with peripheral I/O devices, operating system 125 includes device drivers that serve as a communication intermediary between the peripheral I/O devices and operating system 125. For example, operating system 125 includes a USB mass storage device driver 135 and a USB HID driver 140 that enable operating system 125 to interact with the various peripheral USB devices. As shown, USB mass storage device driver 135 simultaneously supports USB CD-ROM/DVD-ROM drive 145, USB flash drive 150 and USB digital camera 155, and USB HID driver simultaneously supports USB keyboard 160 and USB mouse 165. Operating system 125 further includes a system error handler component 170 that receives requests from USB mass storage device driver 135 and USB HID driver 140 to handle log messages generated by such drivers. System error handler component 170, in turn, interacts with internal hard drive 115 (via a device driver for the internal hard drive, not shown) in order to write log messages received from such device drivers to a system error log file 175 stored in internal hard drive 115 (as indicated by the dotted line in FIG. 1). It should be recognized that the component architecture shown in FIG. 1 is a simplified representation of an actual computer system and one or more embodiments of the invention may be used in many other computer system architectures other than computer system 100. For example, while the USB standard is shown in FIG. 1 as the supported interface between the depicted device drivers of operating system 125 and the depicted peripheral devices, it should be recognized that various other standards may also be utilized, including, for example, a SCSI (Small Computer System Interface) standard, a PCI (Peripheral Component Interconnect) standard, and the like.

Figure 2:
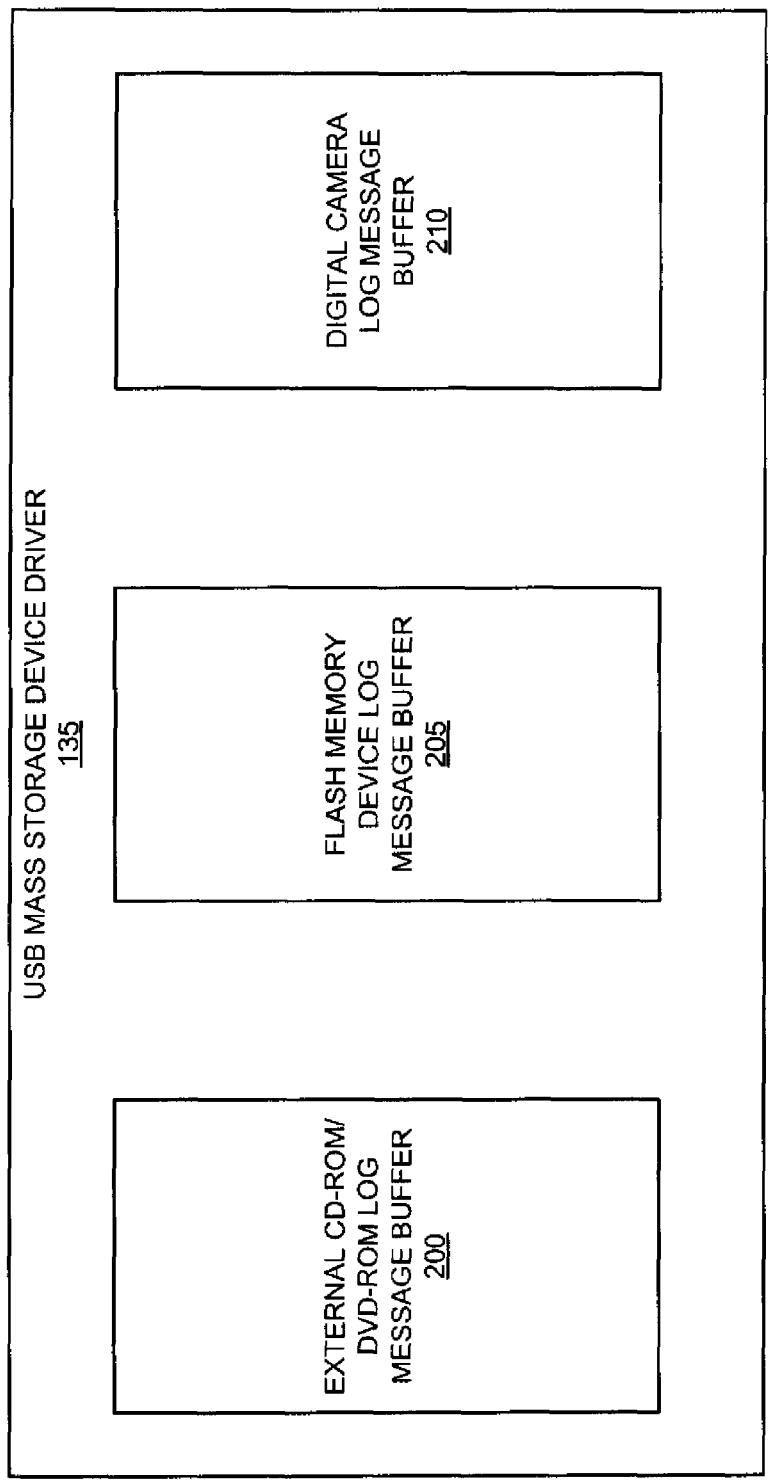
FIG. 2 depicts is a schematic diagram of a device driver.

FIG. 2 is a schematic diagram of a device driver. As depicted, USB mass storage device driver 135 allocates a separate log message buffer for each device that it simultaneously supports. Message buffer 200 has been allocated for USB CD-ROM/DVD-ROM drive 145. Message buffer 205 has been allocated for USB flash drive 150. Message buffer 210 has been allocated for USB digital camera 155. In one embodiment, each message buffer is allocated during an initialization process when the corresponding USB device connects to the computer system (i.e., through a USB port).

Figure 3:
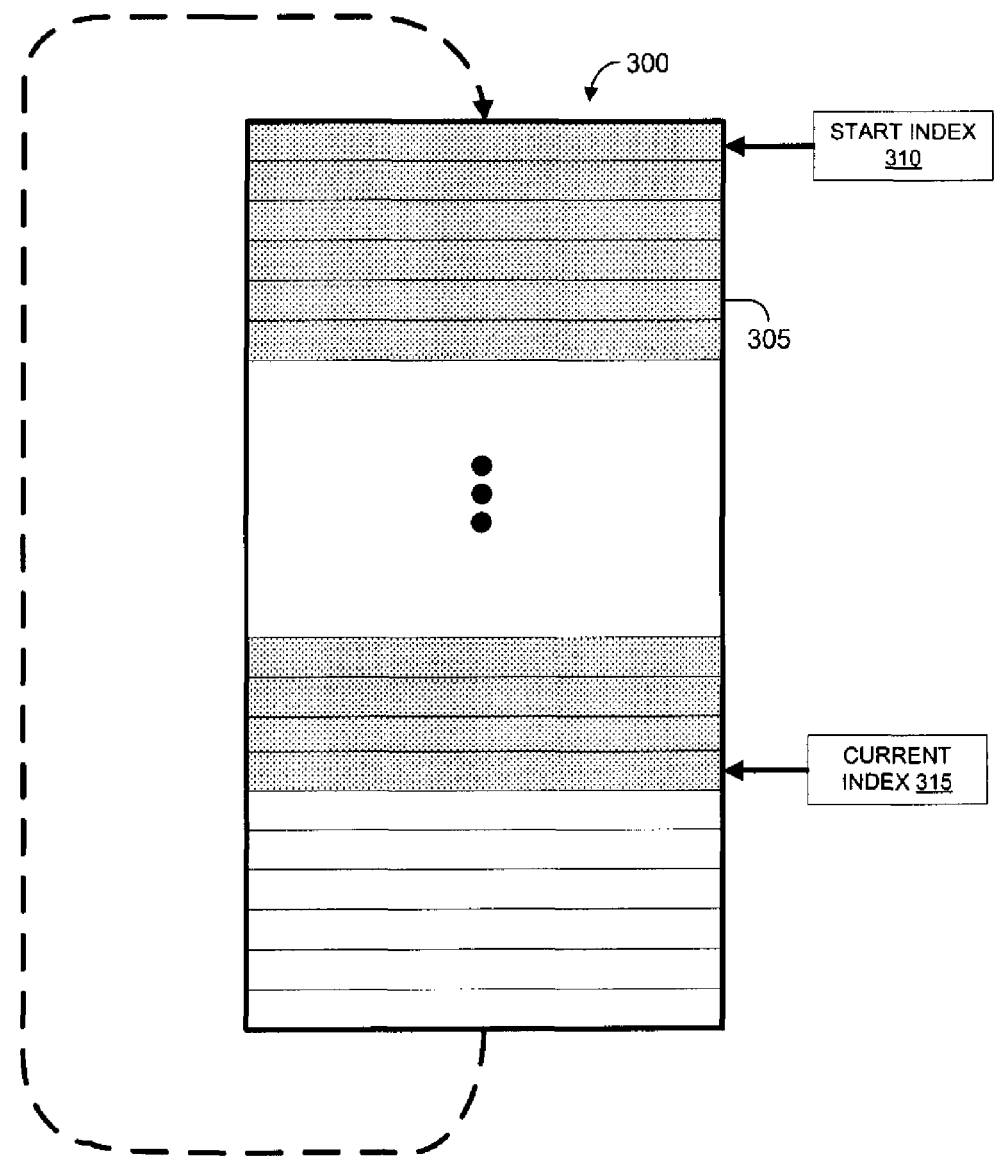
FIG. 3 depicts a log message buffer.

Each of message buffer 200, 205 and 210 may be implemented as a circular buffer shown in FIG. 3. Circular buffer 300 includes a vector of entries. Each entry, such as entry 305, accommodates a text string of a specified length to accommodate a log message. Circular buffer 300 also utilizes a start index 310 and a current index 315 such that the current log messages in circular buffer 300 are flushed (e.g., upon generation of a warning log message) to the error log file in the appropriate order in which they were generated during operation of the device driver. Prior to inserting another log message into circular buffer 300, current index 315 is incremented to the next available entry in the buffer. If incrementing current index 315 causes current index 315 to refer to the same entry as start index 310, then start index 310 is also incremented. As depicted in FIG. 3, the shaded entries of circular buffer 300 are filled with current log messages while the unshaded entries are empty (or otherwise contain previously flushed log messages). It should be recognized that any other data structures may be utilized to implement a log message buffer, including, for example, linked lists, arrays, collections and the like.

Figure 4:
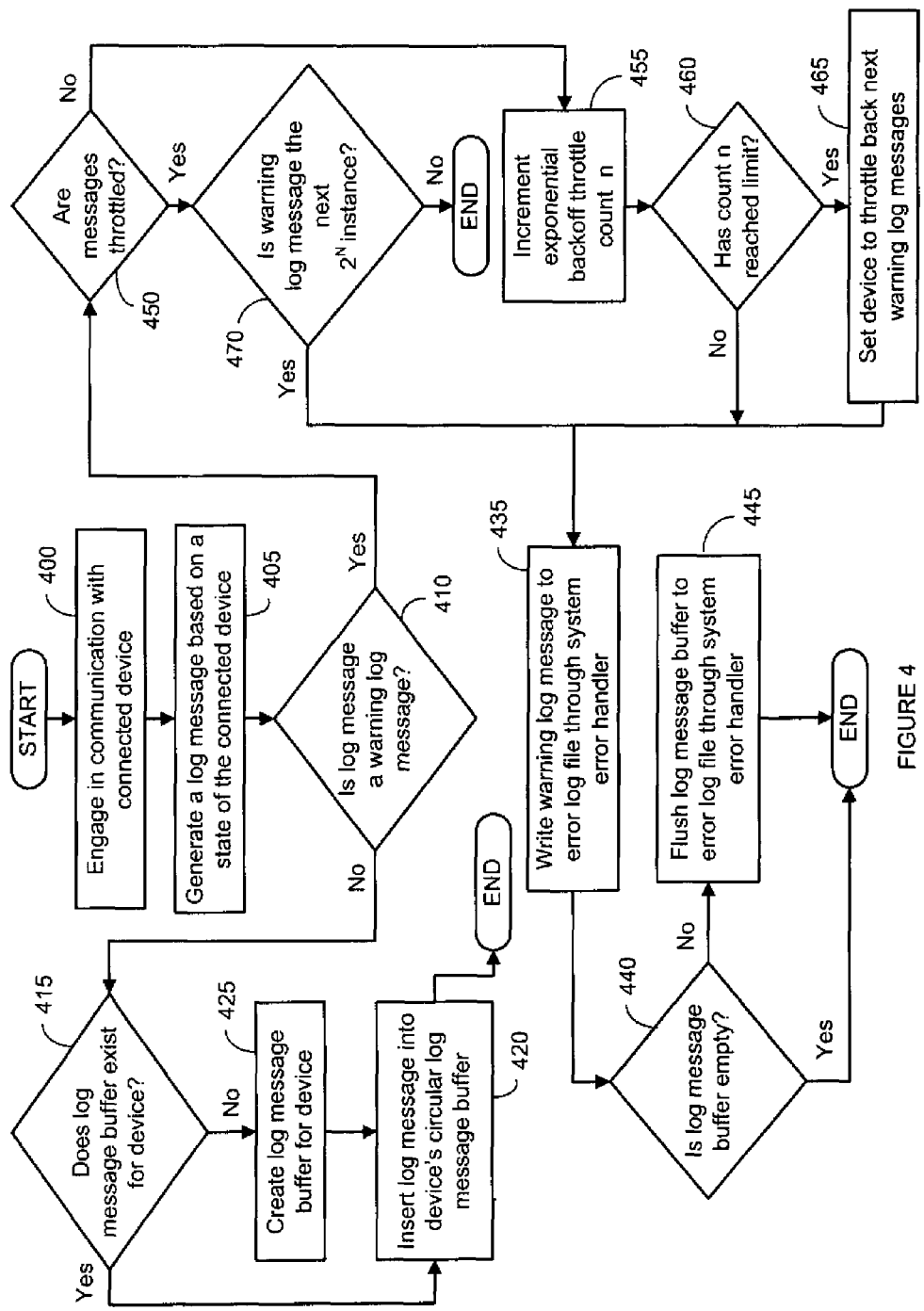
FIG. 4 depicts a flow chart of throttling log messages on a per-device basis, in accordance with one or more embodiments of the present invention.

FIG. 4 depicts a flow chart of throttling log messages on a per-device basis, in accordance with one or more embodiments of the present invention. In step 400, the device driver communicates with one of the devices that it supports. In step 405, depending upon a state of the device, the device driver generates a log message. If, in step 410, the log message is a descriptive log message rather than a warning log message, step 415 is executed. In step 415, if the log message buffer has already been allocated for the supported device, the generated log message is inserted into the device's allocated log message buffer in step 420. If the log message buffer has not been allocated, it is allocated in step 425 prior to the insertion step of 420.

Returning to step 410, if the log message is a warning log message, step 450 is executed. In step 450, the device driver determines whether it is already throttling back warning log messages for the device. If warning log messages are not being throttled, the throttle count for the device is incremented in step 455. In step 460, if the throttle count has reached a specified limit for the device, in step 465, the device driver sets warning log messages for the device to be throttled back using, for example, an exponential back-off algorithm and then proceeds to write the warning log message to the error log file in step 435, and, if the log message buffer is not empty as determined in step 440, flush the log message buffer to the error log file in step 445. If the throttle count has not reached the specified limit, then the device driver simply proceeds to write the warning log message to the error log file in step 435, and, if the log message buffer is not empty as determined in step 440, flush the log message buffer to the error log file in step 445, without setting the device to be throttled.

Returning to step 450, if the warning log message are already being throttled back (e.g., from a previous setting of the throttling in step 465), then the device driver assesses whether the warning log message should be throttled back (e.g., ignored), or whether the warning log message should cause the log message buffer to be flushed. For example, in accordance with one embodiment of an exponential back-off algorithm, if the device driver determines that the warning log message is a $2^N$ occurrence of a warning log message for the device, then the warning log message is written to the error log file in step 435, and the log message buffer is flushed to the error log file in step 445 if it is not empty as determined in step 440. If, however, the warning log message is not a $2^N$ occurrence, then the warning log message is ignored by the device driver.

As illustrated in FIG. 4, step 410 does not distinguish whether a warning log message is a repeat of a previously generated warning log message. As such, an embodiment of the invention that implements a flow similar to FIG. 4 maintains a throttle count for each device rather for each warning log message of each device. Such an embodiment reduces the amount of memory that the device driver utilizes to store throttle counts (i.e., one throttle count per device).

Figure 5:
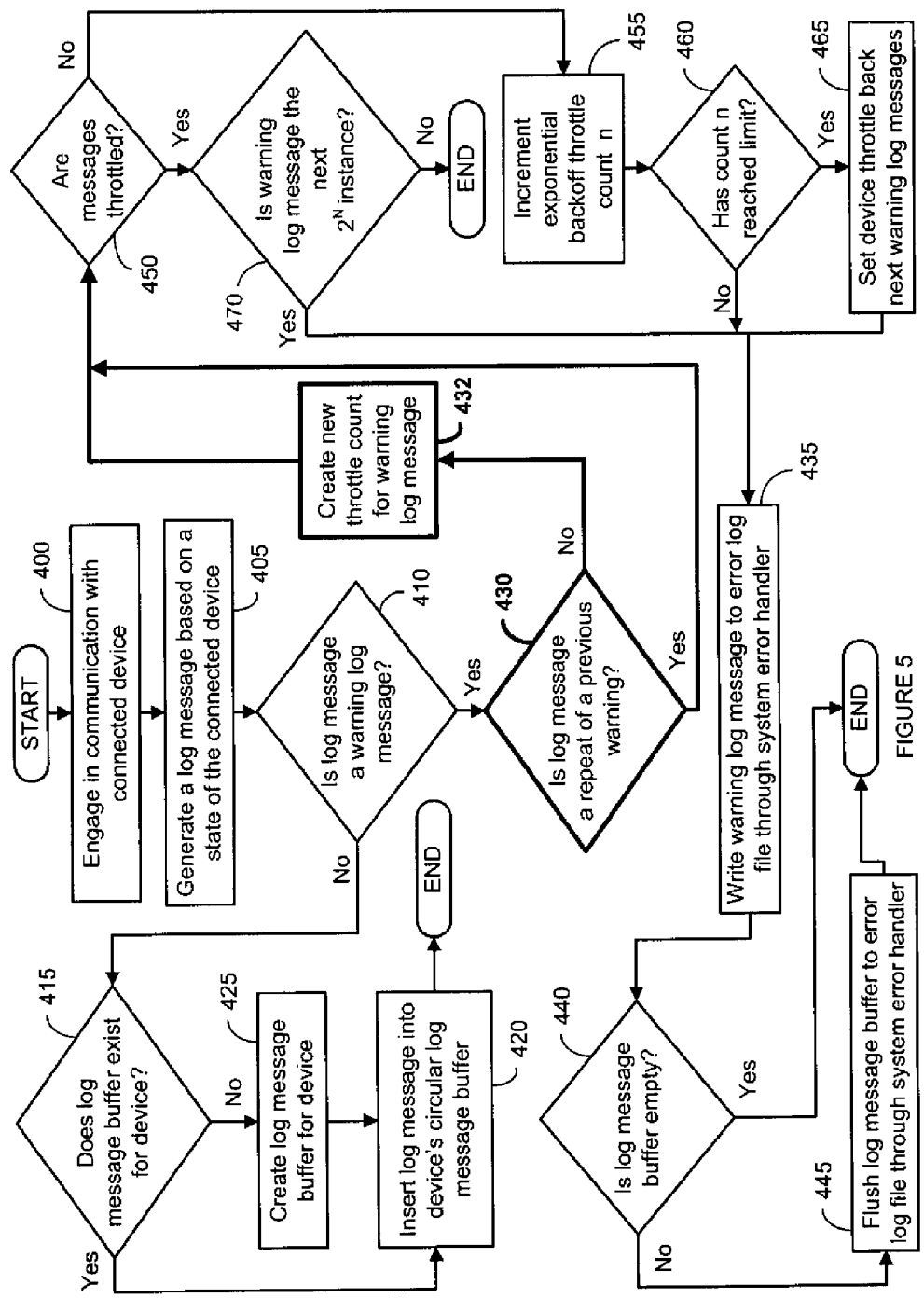
FIG. 5 depicts an alternative flow chart of throttling log messages on a per-device basis, in accordance with one or more embodiments of the present invention.

FIG. 5 depicts an alternative flow chart of throttling log messages on a per-device basis, in accordance with one or more embodiments of the present invention. In contrast to an embodiment implementing the flow of FIG. 4, an embodiment implementing the flow of FIG. 5 maintains a throttle count for each warning log message of each device. The flow of FIG. 5 is similar to the flow of FIG. 4 except that a new step 430 is executed by the device driver if the generated log message is a warning log message as determined by step 410. In step 430, if the warning log message is a repeat of a previous warning log message, the flow continues to step 450 in a fashion similar to that of FIG. 4. However, if the warning log message is not a repeat of a previous warning log message, then in new step 432, the device driver creates a new throttle count for the warning log message.

It should be recognized that implementing "per-device" log message throttling as disclosed herein, wherein each device supported by a device driver is allocated its own message buffer, eliminates the possibility that descriptive log messages stored in a single message buffer that are relevant to resolving a warning log message for one device are overwritten by descriptive log messages relating to other devices prior to being flushed to the error log file. Additionally, the log messages are easier to interpret by an administrator when reviewing the error log file because clusters of log messages in the error log file relate to a single device. Furthermore, in embodiments that implement a throttling flow similar to FIG. 4, the number of throttle counts that are maintained by the device driver is also reduced to the number of supported devices (as opposed to maintaining separate throttle counts for each different warning log message of each different device).

In addition, because each device supported by a device driver is allocated a separate log message buffer, different limits on throttle counts (as checked in step 460 of FIG. 4) can be specified for different devices. Specifying different throttle count limits for each supported device provides an administrator a finer granularity of control, enabling certain devices to be more aggressively throttled (i.e., setting a smaller limit on its throttle count), for example, depending upon the criticality of the device to the operation of the computer system.

It should be recognized that various modifications and changes may be made to the specific embodiments described herein without departing from the broader spirit and scope of the invention as set forth in the appended claims. For example, while the foregoing embodiments have described error log message throttling with respect to device drivers communicating with physical peripheral devices, it should be recognized that any type of log messaging system where a management module or component of a computer system simultaneously supports multiple services may utilize the techniques disclosed herein. Rather having the management module or component allocate a single message buffer to log all messages relating to the different supported services, the management module or component allocates a message buffer for each supported service. For example, the per-device log messaging throttling techniques herein may be utilized in a device driver of a guest operating system of a virtual machine that interacts with virtual devices in an emulation layer of a hypervisor. In addition to device drivers, error log files may be similarly utilized by various system software modules of a computer system. System software modules typically add log messages to error log files by calling into another dedicated software module, such as an error handler, that prints log messages on behalf of all other system software modules. These system software modules support the execution of software applications and may result in a stream of descriptive log messages as memory is allocated for processes, file I/O occurs, etc. and, in the event of errors, warning log messages will also be generated.

One example of a system software module is a hypervisor or virtual machine monitor (VMM) that is capable of supporting multiple virtual machines. Each virtual machine supported by the hypervisor is a distinct source of descriptive and warning log messages. Therefore, it is useful to segregate the descriptive log messages according to the virtual machines with which they are associated. A hypervisor of a virtualized computer system may thus utilize "per-virtual machine" log throttling using the techniques disclosed herein to manage the logging of messages across simultaneously running virtual machines. For example, the hypervisor could maintain separate circular buffers for descriptive log messages of each supported virtual machine and, when a warning log message occurs, flush only the circular buffers associated with that virtual machine, as well as the warning log message to the error log file.

In one environment utilizing virtual machines, a computing infrastructure service provider (e.g., a "cloud computing" provider) may offer an online service for customers to purchase and access computer power on a "per-virtual machine" basis. The techniques disclosed herein may be utilized to provide varying levels of service for message logging relating to such purchased virtual machines by specifying the limits on throttle count (i.e., a higher specified limit, n, for more aggressive log messaging and less log message throttling may correspond to a higher level of service). As such, customers can purchase virtual machine computing power based upon a degree of ease of diagnosis in the event that problems occur. Alternatively, the logging techniques herein could also enable the service provider to easily run workloads expected to be problematic with additional diagnostics turned on without impacting other workloads running on the same computer system (i.e., supported by the same hypervisor). It should further be recognized that alternative embodiments may utilize different log files or utilize different operating system components to allocate per-device log message buffers. For example, in one alternative embodiment, the device driver may utilize a separate error log file for each device that it supports rather than communicating with a system error handler to write to a more global system error log file. Similarly, the system error handler of the operating system (or any other operating system component) may allocate the per-device log message buffers for each of a device driver's supported devices rather than having the device driver allocate the buffers. In an alternative embodiment, the size of the message buffers for each device may be configurable during run-time. Alternative embodiments may provide the ability to permanently throttle a device, for example, if the occurrences of warning log messages are exceedingly high. Alternative embodiments may provide a further level of granularity than the flow depicted in FIG. 4, for example, enabling the device driver to maintain throttle counts for different types of warning log messages for each device (i.e., in exchange for savings in reducing memory usage for storing local variables for such throttle counts).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for logging messages relating to a plurality of devices simultaneously supported by a device driver, the method comprising:
    allocating, by the device driver, a message buffer for each of the plurality of devices, wherein each message buffer is allocated to store log messages for a corresponding device;
    generating a first warning log message in response to interacting with a first device in the plurality of devices;
    flushing log messages in the message buffer corresponding to the first device to a log file upon generating the first warning log message in accordance with a log message throttling heuristic;
    generating a second warning log message in response to interacting with a second device in the plurality of devices; and
    flushing log messages in the message buffer corresponding to the second device to the log file upon generating the second warning log message in accordance with the log message throttling heuristic.

2. The method of claim 1, further comprising, for each of the plurality of devices, maintaining a count of occurrences of warning log messages and a corresponding specified limit for the count.

3. The method of claim 2, wherein the specified limit for each of the counts corresponding to each of the devices is configurable.

4. The method of claim 2, wherein the log message throttling heuristic comprises:
    determining whether the count for a given device in the plurality of devices has exceeded the corresponding specified limit for the count; and
    performing exponential back-off on the occurrences of warning log messages for the given device to determine if a currently generated warning log message causes the log messages in the message buffer corresponding to the given device to be flushed to the log file by the device driver.

5. The method of claim 1, wherein the log message throttling heuristic further comprises flushing the log messages in the message buffer corresponding to a given device to the log file if the currently generated warning log message is a $2^N$ occurrence of a warning log message for the given device.

6. The method of claim 1, wherein each message buffer is a circular buffer comprising a plurality of entries for storing text strings relating to log messages.

7. The method of claim 6, wherein the circular buffer further includes a start index and a current index that are utilized to flush the circular buffer in a correct order.

8. The method of claim 1, wherein each of the message buffers are allocated during an initialization process upon a connection of a corresponding device to the computer system.

9. A non-transitory computer-readable medium including instructions that, when executed by a processing unit of a computer system having a device driver capable of simultaneously supporting a plurality of devices, causes the processing unit to log messages relating to interactions between the device driver and the plurality of devices to a log file, by performing steps of:
  allocating, by the device driver, a message buffer for each of the plurality of devices, wherein each message buffer is allocated to store log messages for a corresponding device;
  generating a first warning log message in response to interacting with a first device in the plurality of devices;
  flushing log messages in the message buffer corresponding to the first device to the log file upon generating the first warning log message in accordance with a log message throttling heuristic;
  generating a second warning log message in response to interacting with a second device in the plurality of devices; and
  flushing log messages in the message buffer corresponding to the second device to the log file upon generating the second warning log message in accordance with the log message throttling heuristic.

10. The non-transitory computer-readable medium of claim 9, wherein the processing unit further performs, for each of the plurality of devices, maintaining a count of occurrences of warning log messages and a corresponding specified limit for the count.

11. The non-transitory computer-readable medium of claim 10, wherein the specified limit for each of the counts corresponding to each of the devices is configurable.

12. The non-transitory computer readable medium of claim 10, wherein the log message throttling heuristic comprises:
  determining whether the count for a given device in the plurality of devices has exceeded the corresponding specified limit for the count; and
  performing exponential back-off on the occurrences of warning log messages for the given device to determine if a currently generated warning log message causes the log messages in the message buffer corresponding to the given device to be flushed to the log file by the device driver.

13. The non-transitory computer readable medium of claim 12, wherein the log message throttling heuristic further comprises flushing the log messages in the message buffer corresponding to a given device to the log file if the currently generated warning log message is a $2^N$ occurrence of a warning log message for the given device.

14. A method for logging messages for a software module simultaneously supporting a plurality of services, the method comprising:
  allocating a message buffer for each of the plurality of services, wherein each message buffer is allocated to store log messages for a corresponding service;
  generating a first warning log message in response to interacting with a first service in the plurality of services;
  flushing log messages in the message buffer corresponding to the first service to a log file upon generating the first warning log message in accordance with a log message throttling heuristic;
  generating a second warning log message in response to interacting with a second service in the plurality of services; and
  flushing log messages in the message buffer corresponding to the second service to the log file upon generating the second warning log message in accordance with the log message throttling heuristic.

15. The method of claim 14, wherein each service in the plurality of services is a virtual machine.

16. The method of claim 15, wherein the software module is an error handler component of a hypervisor.

17. A method for logging messages for a software module simultaneously supporting a plurality of services, the method comprising:
  allocating a message buffer for each of the plurality of services, wherein each message buffer is allocated to store log messages for a corresponding service;
  generating a first warning log message in response to interacting with a first service in the plurality of services;
  flushing log messages in the message buffer corresponding to the first service to a log file upon generating the first warning log message in accordance with a log message throttling heuristic;
  generating a second warning log message in response to interacting with a second service in the plurality of services;
  flushing log messages in the message buffer corresponding to the second service to the log file upon generating the second warning log message in accordance with the log message throttling heuristic; and
  for each of the plurality of services, maintaining a count of occurrences of warning log messages and a corresponding specified limit for the count.

18. The method of claim 17, wherein the specified limit for each of the counts corresponding to each of the services is configurable.

19. The method of claim 17, wherein the log message throttling heuristic comprises:
  determining whether the count for a service in the plurality of services has exceeded the corresponding specified limit for the count; and
  performing exponential back-off on the occurrences of warning log messages for the service to determine whether to throttle back a currently generated warning log message for the service; and
  if the currently generated warning log message for the service is not to be throttled back, flushing the log messages corresponding to the service to the log file.

20. The method of claim 17, wherein the throttling heuristic further comprises flushing the log messages in the message buffer corresponding to the service to the log file if the currently generated warning log message is a $2^N$ occurrence of a warning log message for the device.

* * * * *